Sept. 21, 1965 H. J. DONELSON, JR Re. 25,862

MATERIAL SPREADER FOR CONFINED AREAS

Original Filed Dec. 3, 1959 2 Sheets-Sheet 1

Inventor
Harlan J. Donelson Jr.
by M. Talbert Dick
Attorney

MATERIAL SPREADER FOR CONFINED AREAS

Original Filed Dec. 3, 1959 2 Sheets-Sheet 2

Inventor
Harlan J. Donelson Jr.
by M. Talbert & Dick
Attorney

United States Patent Office

Re. 25,862
Reissued Sept. 21, 1965

25,862

MATERIAL SPREADER FOR CONFINED AREAS

Harlan J. Donelson, Jr., W. Highway 330,
Marshalltown, Iowa

Original No. 2,980,009, dated Apr. 18, 1961, Ser. No. 857,055, Dec. 3, 1959. Application for reissue Feb. 11, 1963, Ser. No. 258,118
11 Claims. (Cl. 98—55)

Matter enclosed in heavy brackets [ ] appears in the original patent but forms no part of this reissue specification; matter printed in italics indicates the additions made by reissue.

This invention relates to a material spreading means and more particularly to a spreader that will evenly and uniformly deposit material such as kernels of corn, silage, beans and the like in closed storage space areas such as granaries, silos, and the like.

The desirability of uniform density of materials in these storage areas has only become knowingly critical in rather recent times. The necessity became apparent with the new type of granaries wherein the material was aerated and/or dry heated as it flowed into the storage housing. The air or heated air is passed through the granary from bottom to top. The custom is to pour the grain or the like through a spout into the granary from its top. The grain will first pile up in the bottom central area of the storage space and therefore will be much more dense or compact in such poured area than that of the surrounding area. This means that in the drying phase, the surrounding area will be successfully treated while the compacted area will not. It is because of this problem that one or two workers with shovels must be in the granary and shovel and move the grain or the like around during the time it is being poured into the top of the granary. Obviously, such work is most difficult as it is under heat and dust conditions.

Therefore one of the principal objects of my invention is to provide a means that will successfully, uniformly and evenly spread grain or the like into a granary or the like during the placement of the material into such storage space.

A further object of this invention is to provide a scatter means for use when pouring material into a storage area that eliminates the need of workmen within the storage area during the pouring phase.

A still further object of this invention is to provide a material scattering means for granaries that makes possible the chaff, dirt and the like cleaning of the material as it is deposited in the storage area.

A still further object of my invention is to provide a material spreader for confined areas that is economical of manufacture and durable in use.

These and other objects will be apparent to those skilled in the art.

My invention consists in the construction arrangement, and combination, of the various parts of the device, whereby the objects contemplated are attained as hereinafter more fully set forth, specifically pointed out in my claims, and illustrated in the accompanying drawings, in which:

Figure 1:
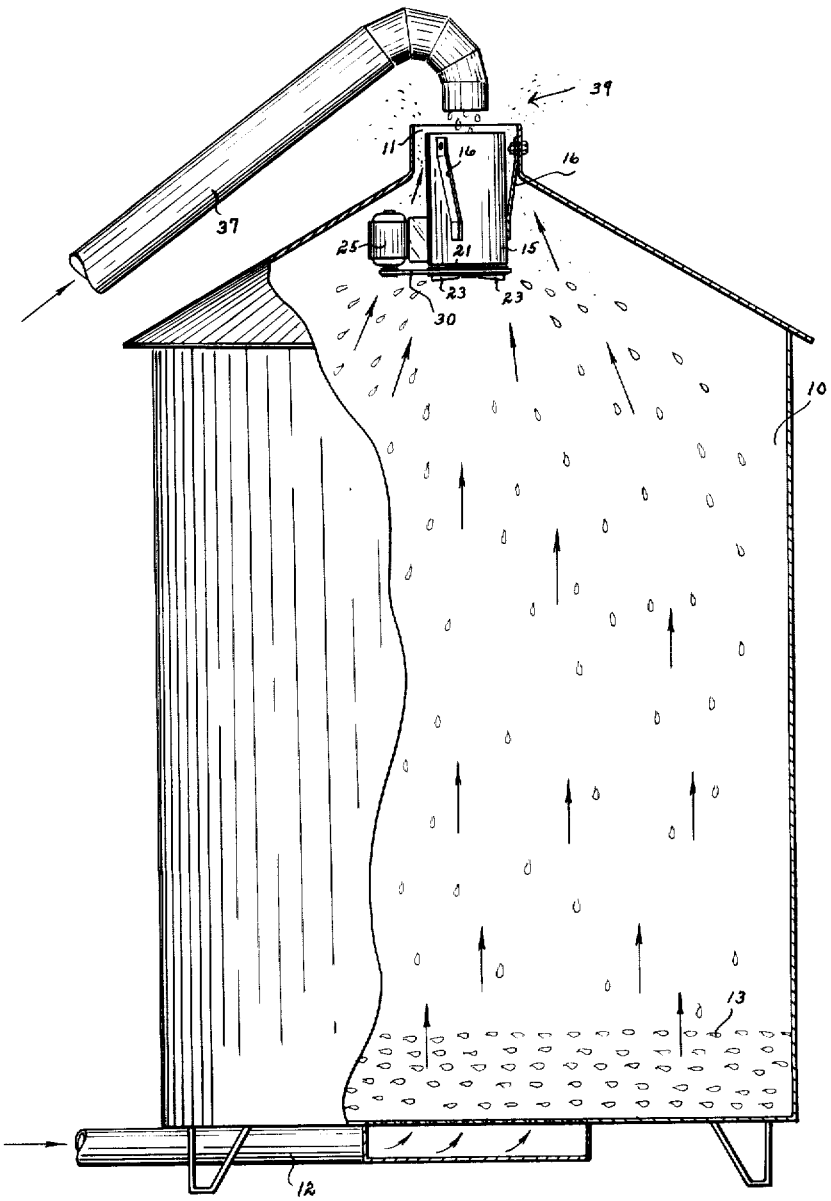
FIGURE 1 is a side view of my device in use.
Figure 2:
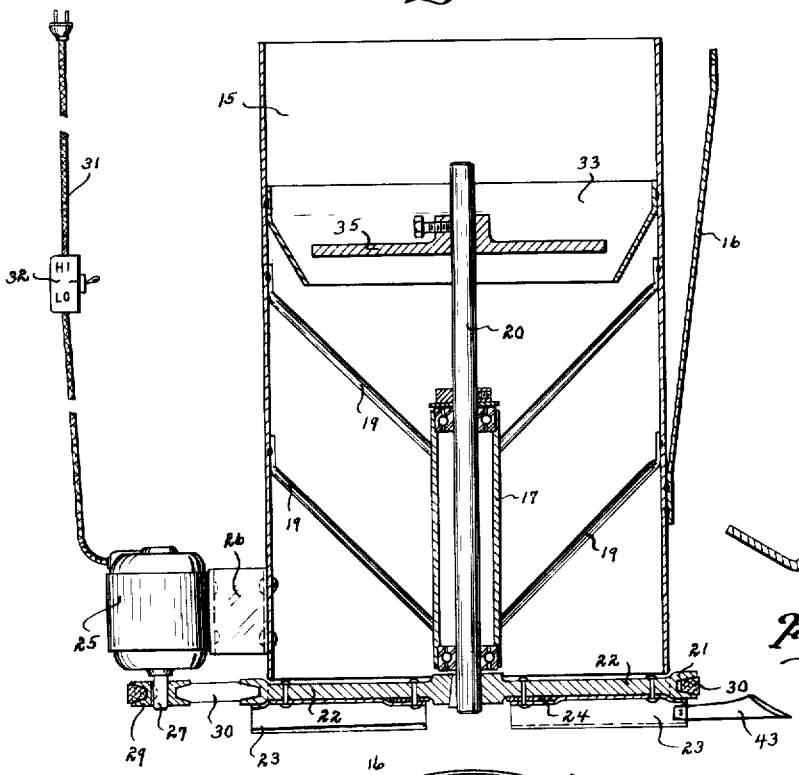
FIGURE 2 is an enlarged side sectional view of my material scattering apparatus taken on line 2—2 of FIGURE 4.
Figure 3:
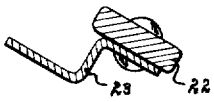
FIGURE 3 is an enlarged cross-sectional view of one of the rotating vanes and is taken on line 3—3 of FIGURE 4.
Figure 4:
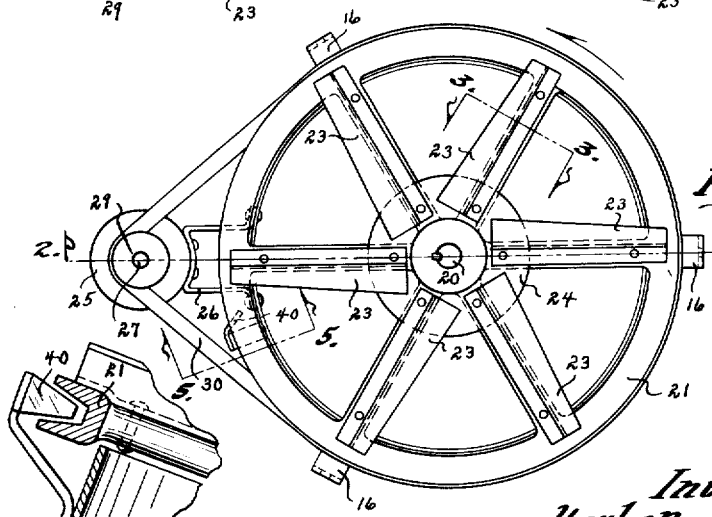
FIGURE 4 is an enlarged bottom view of the device and more fully illustrates its construction.

In the drawings I have designated the ordinary granary by the numeral 10, having the top central opening 11. The numeral 12 designates a conduit having its outlet end communicating with the inside bottom of the granary and its other end adapted to be in communication with a source of air or heated air under pressure. Such air flow may be through the granary during and/or after the placement of the material in the granary. I have used the numeral 13 to designate material such as grain or the like. It is with such a storage space that I use my device and which I will now describe in detail. The numeral 15 designates a vertical tube housing open at both ends, and having a diameter less than that of the diameter of the opening 11 of the granary. Secured to the outer side of the tube 15 are supporting arms 16 detachable secured to the granary by bolts or the like for holding the tube housing 15 centered within the openings 11 as shown in FIGURE 1. The numeral 17 designates a vertical bearing supported in the vertical center of the tube housing 15 by brace arms or the like 19. Rotatably mounted in the elongated bearing 17 is a vertical shaft 20. This shaft extends upwardly to a point near the top of the housing 15 and has its lower end extending below the horizontal plane of the housing 15 as shown in FIGURE 2. The numeral 21 designates a pulley wheel secured on the lower end of the shaft 20 and positioned directly below the housing 15. This pulley wheel 21 has the usual spaced apart spokes 22 and is of a diameter greater than that of the diameter of the tube housing 15. Secured to each of the spokes 22 by any suitable means is a vane 23 as shown in FIGURE 4. Each of these vanes extends first downwardly from the spoke and then horizontally laterally as shown in FIGURE 3. The numeral 24 designates a plate secured by any suitable means to the central area of the pulley wheel 21 for guiding material onto the various vanes 23. The numeral 25 designates an electric motor secured by a bracket 26 to the lower outside of the tubular housing 15. This motor is preferably of a multiple speed type and has secured to its drive shaft 27 small pulley wheel 29. The numeral 30 designates an endless belt embracing the pulley wheel 21 and pulley wheel 29. The numeral 31 designates electrical lead cords having one end connected to the motor 25 and the other end adapted to be connected to a source of electrical energy. The numeral 32 designates a switch means imposed in the electric cord 31 for turning the motor 25 on or off and to regulate, if desired, the speed of the motor. The numeral 33 designates an open bottom downwardly and inwardly extending hopper chute secured in the upper end portion of the tubular housing 15. The numeral 35 designates a vertically adjustable material feeding plate on the shaft 20 and within the hopper 33 as shown in FIGURE 2.

With my apparatus in place as shown in FIGURE 1 and with the motor running, the grain or the like is dropped into the upper end of the tubular housing by any common and well-known pipe or conveyor means 37. The material will follow downwardly through the hopper 33 and thence downwardly through the tubular housing 15. As the grain or the like material passes between the spokes of the pulley wheel 21, it will be contacted by the vanes 23 and inasmuch as these vanes are rotating with the pulley wheel, the material will be scattered evenly in the top area of the granary as shown in FIGURE 1. By so scattering the grain it will fall uniformly and evenly to the bottom of the granary and there will be no pyramid such as is built up by the grain when my device is not used. Therefore, by the use of my device there will be no dense areas in the grain or the like accumulating in the bottom of the building. The grain or the like will be evenly distributed and if air or warmed air is passed upwardly through the grain or the like, the same will evenly and uniformly contact all of the material thereby drying it uniformly. Still another advantage realized by the use of my device is the separating and elimination of dust, chaff and the like foreign matter 39. The reason for this is that with the downwardly passing grain being scattered as shown in FIGURE 1, the air column from the pipe 12 will pass upwardly through such separated kernels of grain carrying with it the undesired light foreign matter. The escape of this undesired foreign matter is made possible by having the diameter of the tubular housing 15 less than that of the diameter of the opening 11. Even if this rising air column does not remove all of the chaff and the like; the remaining foreign matter will be evenly distributed through the collected material in the bottom of the building.

From the foregoing it will be readily seen that the use of my device does not only eliminate workmen inside the building as it is being filled with material but it automatically uniformy deposits the grain or the like into the storage area. As herebefore indicated, my apparatus may be used for the depositing of various material. The material for storage may require for proper scattering the changing of speed of the prime mover and therefore I recommend that the motor 25 be of adjustable variable speeds. Also this material may require different settings for the adjustable feed plate 35. Furthermore, the different size buildings may require motor speed adjustment.

Figure 5:
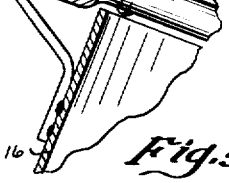
FIGURE 5 is an enlarged cross-sectional view taken on line 5—5 of FIGURE 4 and illustrates the pulley wheel cleaning means.

To prevent material getting into and clogging the pulley wheel 21, I have a cleaning finger 40 extending into the groove of the pulley wheel as shown in FIGURE 5.

To facilitate an upward moving column of air for cleaning the material as it moves downwardly in the storage area, one or more fan blades 43 may be operatively secured to the shaft 20 and/or pulley wheel 21 as shown in FIGURE 2.

Some changes may be made in the construction and arangement of my material spreader for confined areas without departing from the real spirit and purpose of my invention, and it is my intention to cover by my claims, any modified forms of structure or use of mechanical equivalents which may be reasonably included within their scope.

I claim:

1. A drying and storage apparatus for particulate material comprising in combination a storage housing having a base end and an opening in the other end thereof vertically spaced from said base end;

means for introducing gas under pressure into said housing whereby it passes through said housing and out of said opening;

an auxiliary tubular housing having a smaller periphery than said opening;

means for supporting said auxiliary housing in said opening and within said storage housing whereby an air outlet exists between said auxiliary housing and the side wall of said opening;

said auxiliary housing having a length which is a small fraction of the distance between said base end and said other end;

means for rotably supporting a shaft within said auxiliary housing;

a rotable spoked support carried by said shaft adjacent the end of said auxiliary housing nearest said base end;

means within said storage housing for rotating said spoked support;

and a plurality of vanes carried by different of the spokes of said spoked support whereby particulate material entering said auxiliary housing passes through said spoked support, and onto and off said vanes, for even distribution within said storage housing and simultaneously gas passes through said storage housing counter-current to particulate material entering said storage housing via said auxiliary housing and passing within said storage housing under the action of gravity.

2. A drying and storage apparatus for particulate material comprising the combination defined in claim 1 wherein means for supporting auxiliary housing within said opening comprises bracket arms extending between the inner walls of the storage housing and the outer wall of said auxiliary housing.

3. A drying and storage apparatus for particulate material comprising the combination defined in claim 1 wherein said spoked support comprises a spoked pulley and wherein said means for rotating said support comprises a motor-driven pulley, and an endless belt extending between said spoked pulley and said motor-driven pulley.

4. A drying and storage apparatus for particulate material comprising the combination defined in claim 1 wherein said vanes include shelf portions supported below said spokes, and wherein said shelf portions have a decreasing width as the distance therealong from said shaft increases.

5. A drying and storage apparatus for particulate material comprising the combination defined in claim 1 including means to resecure said means for rotating said spoked support to said auxiliary housing.

6. A drying and storage apparatus for particulate material comprising in combination a storage housing having a base and an opening in the other end thereof vertically spaced from said base end;

means for introducing gas under pressure into said housing whereby it passes through said housing to said opening;

an auxiliary tubular housing having a smaller periphery than said opening and supported in said opening and within said storage housing;

said auxiliary housing having a length which is a small fraction of the distance between said base end and said other end;

means for rotatably supporting a shaft within said auxiliary housing;

a rotatable spoked support carried by said shaft adjacent the end of said auxiliary housing nearest said base end;

means within said storage housing for rotating said spoked support;

a plurality of vanes carried by different of the spokes of said support whereby particulate material entering said auxiliary housing passes through said spoked support, and onto and off of said vanes, for even distribution within said storage housing and simultaneously gas passes through said storage housing counter-current to particulate material entering said storage housing via said auxiliary housing and passing within said storage housing under the action of gravity;

an open-ended frusto-conical hopper member carried within said auxiliary housing in spaced relation to said end of said auxiliary housing and disposed to direct material toward the center of said auxiliary housing;

and a disc member carried on said shaft, and means for adjustably mounting said disc member for movement along said shaft, said disc member being disposed between the extremities of said hopper member and having a smaller diameter than said housing whereby said disc member is movable with respect to said hopper member to adjust the opening between said disc member and said hopper member to control particulate material passing therebetween and through said housing.

7. A storage apparatus for particulate material comprising in combination a storage housing having a base end and opening in the other end thereof vertically spaced from said base end;

an auxiliary tubular housing having a smaller periphery than said opening;

means for supporting said auxiliary housing in said opening and within said storage housing whereby an air outlet exists between said auxiliary housing and the side wall of said opening, said auxiliary housing having a length which is a small fraction of the distance between said disc end and said other end of said storage housing, means for rotatably supporting a vertical shaft within said auxiliary housing;

a rotatable spoked support transversely carried on said shaft adjacent the end of said auxiliary housing nearest said base end;

means within said storage housing for rotating said spoked support;

and a plurality of vanes carried by different of the spokes of said spoked support whereby particulate material entering said auxiliary housing passes through said spoked support, and onto and off of said vanes, for even distribution within said storage housing.

*8. In a material spreader for confined areas,*

*a tubular housing,*

*means for supporting said housing in the open upper end of a drying and storage apparatus,*

*a vertical shaft rotatably mounted in said housing,*

*means for supporting said shaft within said housing,*

*a rotatable spoked support carried by said shaft adjacent the bottom end of said shaft,*

*means operatively engaging the periphery of said spoked support for rotation thereof,*

*and a plurality of vanes carried by different of the spokes of said spoked support, said vanes including shelf portions supported below said spokes.*

*9. In material spreader for confined areas,*

*a tubular housing,*

*means for supporting said housing in the open upper end of a drying and storage apparatus,*

*a vertical shaft rotatably mounted in said housing,*

*means for supporting said shaft within said housing,*

*a rotatable spoked support carried by said shaft adjacent the bottom end of said shaft,*

*means operatively engaging the periphery of said spoked support for rotation thereof,*

*and a plurality of vanes carried by different of the spokes of said spoked support,*

*said vanes including shelf portions supported below said spokes, at least some of said shelf portions having a decreasing width as the distance therealong from said shaft increases.*

*10. In a material spreader for confined areas,*

*a tubular housing,*

*means for supporting said housing in the open upper end of a drying and storage apparatus,*

*a vertical shaft rotatably mounted in said housing,*

*means for supporting said shaft within said housing,*

*a rotatable spoked support carried by said shaft adjacent the bottom end of said shaft,*

*means operatively engaging the periphery of said spoked support for rotation thereof,*

*and a plurality of vanes carried by different of the spokes of said spoked support,*

*said housing including an open-ended inverted frusto-conical portion, a disc member carried on said shaft, and*

*means for adjustably mounting said disc member along said shaft whereby said disc member can be selectively positioned with respect to said frusto-conical portion to control particulate material passing through said housing.*

*11. In a material spreader for confined areas,*

*a tubular housing,*

*means for supporting said housing in the open upper end of a drying and storage apparatus,*

*a vertical shaft rotatably mounted in said housing,*

*means for supporting said shaft within said housing,*

*a rotatable spoked support carried by said shaft adjacent the bottom end of said shaft,*

*means operatively engaging the periphery of said spoked support for rotation thereof,*

*and a plurality of vanes carried by different of the spokes of said spoked support,*

*said housing including an open-ended inverted frusto-conical hopper member carried within said housing and disposed to direct material to the center of said housing, a disc member carried on said shaft, and means for adjustably mounting said disc member for movement along said shaft, said disc member being disposed between the extremities of said hopper member and having a smaller diameter than said housing whereby said disc member is movable with respect to said hopper member to adjust the opening between said disc member and said hopper member to control particulate material passing therebetween and through said housing.*

References Cited by the Examiner

The following references, cited by the Examiner, are of record in the patented file of this patent or the original patent.

UNITED STATES PATENTS

| | | | |
|---|---|---|---|
| 74,125 | 2/68 | Pickens | 222—285 |
| 1,474,683 | 11/23 | Morton | 98—55 |
| 1,723,679 | 8/29 | Coberly et al. | 48—52 |
| 1,981,433 | 11/34 | Shodron | 98—54 |
| 2,696,904 | 12/54 | Sandberg | 198—128 X |
| 2,767,884 | 10/56 | Gross | 222—410 X |

WILLIAM F. O'DEA, *Primary Examiner.*

ROBERT A. O'LEARY, *Examiner.*